(12) United States Patent
Liu et al.

(10) Patent No.: US 8,223,427 B2
(45) Date of Patent: *Jul. 17, 2012

(54) METHOD OF FIXING POLARIZATION-REVERSED REGION FORMED IN FERROELECTRIC SINGLE CRYSTAL

(75) Inventors: Xiaoyan Liu, Tsukuba (JP); Shunji Takekawa, Tsukuba (JP); Kazuya Terabe, Tsukuba (JP); Shunichi Hishita, Tsukuba (JP); Kenji Kitamura, Tsukuba (JP)

(73) Assignee: National Institute for Materials Science, Tsukuba-Shi (JP)

( * ) Notice: Subject to any disclaimer, the term of this patent is extended or adjusted under 35 U.S.C. 154(b) by 974 days.

This patent is subject to a terminal disclaimer.

(21) Appl. No.: 12/225,162

(22) PCT Filed: Mar. 5, 2007

(86) PCT No.: PCT/JP2007/054742
§ 371 (c)(1),
(2), (4) Date: Sep. 16, 2008

(87) PCT Pub. No.: WO2007/108339
PCT Pub. Date: Sep. 27, 2007

(65) Prior Publication Data
US 2009/0231703 A1 Sep. 17, 2009

(30) Foreign Application Priority Data

Mar. 17, 2006 (JP) ................................ 2006-074203

(51) Int. Cl.
*G02F 1/35* (2006.01)
*G02F 2/02* (2006.01)
(52) U.S. Cl. ......... 359/328; 359/332; 359/566; 359/576
(58) Field of Classification Search ................. None
See application file for complete search history.

(56) References Cited

U.S. PATENT DOCUMENTS

| 4,692,779 | A | * | 9/1987 | Ando et al. ............. 347/123 |
| 5,715,092 | A | * | 2/1998 | Gupta et al. ............. 359/566 |
| 5,748,361 | A | * | 5/1998 | Gupta et al. ............. 359/332 |
| 7,976,717 | B2 | * | 7/2011 | Li et al. ............. 216/87 |

FOREIGN PATENT DOCUMENTS

| JP | H07-230969 | 8/1995 |
| JP | H11-072809 | 3/1999 |
| JP | 2002-196381 | 7/2002 |
| JP | 2002-230720 | 8/2002 |
| JP | 2004-158627 | 6/2004 |
| JP | 2006-018029 | 1/2006 |

* cited by examiner

*Primary Examiner* — Duy Deo
(74) *Attorney, Agent, or Firm* — Manabu Kanesaka

(57) ABSTRACT

A method of fixing a polarization-reversed region formed in a ferroelectric single crystal, including preparing a ferroelectric single crystal having a polarization-reversed region; and irradiating an ion beam or a neutral beam on the ferroelectric single crystal. The ferroelectric single crystal is a substantially stoichiometric lithium tantalate single crystal or a substantially stoichiometric lithium niobate single crystal, and the polarization-reversed region is fixed and any back switch and expansion of the polarization-reversed region are suppressed.

6 Claims, 5 Drawing Sheets

(A)

(B)

(A)

(B)

(A)

(B)

METHOD OF FIXING POLARIZATION-REVERSED REGION FORMED IN FERROELECTRIC SINGLE CRYSTAL

TECHNICAL FIELD

The present invention relates to a technique of fixing a polarization-reversed region formed in a ferroelectric single crystal.

BACKGROUND ART

Massive research efforts have recently been and currently being paid on optical elements such as frequency modulators and light wavelength conversion elements where periodic polarization-reversed regions (polarization-reversed structures) are formed in the inside of a ferroelectric. Stoichiometric lithium tantalate single crystals and stoichiometric lithium niobate single crystals are attracting attention as such ferroelectric single crystals.

In such a single crystal, there arises a problem that some formed neighboring polarization-reversed regions can be combined together and/or some formed polarization-reversed regions can become polarization-reversed once again (back-switch) depending on the conditions of forming the polarization-reversed regions.

In addition to the above-identified problem, a back-switch of polarization-reversed regions and/or an expansion of polarization-reversed regions have been observed during a working process of preparing modulators or wavelength conversion elements after forming polarization-reversed regions particularly when stoichiometric lithium tantalate single crystals are employed out of stoichiometric lithium tantalate single crystals and stoichiometric lithium niobate single crystals as listed above.

To cope with these problems, techniques relating to a method of inverting polarization by controlling the order of lattice points and those relating to a method of inverting polarization by controlling the defect density have been proposed (see, for example, Patent Document 1 and Patent Document 2).

The technique described in Patent Document 1 reduces polarization-reversed regions that are combined together and also the back-switch phenomenon by providing a control layer showing a low degree of order of lattice points on the face where an electric field is applied. On the other hand, the technique described in Patent Document 2 reduces polarization-reversed regions that are bonded together and also the back-switch phenomenon by providing a control layer showing a high defect density on the face where an electric field is applied.

Patent Document 1: JP 2005-148202-A
Patent Document 2: JP 2005-148203-A

DISCLOSURE OF THE INVENTION

Problem to be Solved by the Invention

However, the methods described in Patent Document 1 and Patent Document 2 as cited above indispensably require providing a control layer in advance before forming polarization-reversed regions. Therefore, the conditions of forming polarization-reversed regions (e.g., the magnitude of the coercive electric field) can vary depending on the thickness of the control layer and the degree of order of the lattice points of the control layer to make the process complex, reduce the yield and raise the cost.

Additionally, the methods described in Patent Document 1 and Patent Document 2 as cited above indispensably require that the polarization-reversed regions extend through the ferroelectric single crystal in the direction of polarization and get to the control layer. In other words, those methods are not effective for optical elements where polarization-reversed regions are formed only on the surface of a ferroelectric single crystal.

Therefore, an object of the present invention is to provide a method of fixing the polarization-reversed regions formed in a ferroelectric single crystal with ease.

Means for Solving the Problem

A method of fixing the polarization-reversed regions formed in a ferroelectric single crystal according to the present invention includes a step of irradiating an ion beam or a neutral beam on the ferroelectric single crystal where polarization-reversed regions are formed to thereby achieve the object.

The ferroelectric single crystal has a first face perpendicular to the direction of polarization and a second face opposite to the first face and the irradiating step can irradiate a beam on at least either of the first face and the second face when the polarization-reversed regions extend through from the first face to the second face but irradiate a beam on the first face when the polarization-reversed regions do not extend through from the first face to the second face.

The ferroelectric single crystal may be a substantially stoichiometric lithium tantalate single crystal or a substantially stoichiometric lithium niobate single crystal.

The substantially stoichiometric lithium tantalate single crystal or the substantially stoichiometric lithium niobate single crystal may contain an element selected from a group of Mg, Zn, Sc and In by 0.1 mol % to 3.0 mol %.

An optical element containing a ferroelectric single crystal having fixed polarization-reversed regions is manufactured by a method including a step of irradiating an ion beam or a neutral beam on the ferroelectric single crystal where polarization-reversed regions are formed to thereby achieve the object.

The optical element may have a stop layer held in contact with the polarization-reversed regions and the stop layer may show a degree of order lower than the degree of order of the lattice points of the ferroelectric single crystal.

Advantages of the Invention

Thus, a method according to the present invention includes a step of irradiating an ion beam or a neutral beam on the surface of the ferroelectric single crystal where polarization-reversed regions are formed. The crystallinity of the surface of the ferroelectric single crystal falls due to the irradiation of the beam. Then, as a result, the polarization-reversed regions produced once by polarization-reversal cannot reverse the polarization again in the ferroelectric single crystal showing a reduced degree of crystallinity (in other words, does not give rise to a back-switch phenomenon). Therefore, the polarization-reversed regions that are once formed can be fixed without giving rise to any back-switch phenomenon. Additionally, the conditions of forming the polarization-reversed regions can be fixed because the beam is irradiated only after forming the polarization-reversed regions to improve the yield and reduce the cost.

EXPLANATION OF REFERENCE SYMBOLS

Figure 1:
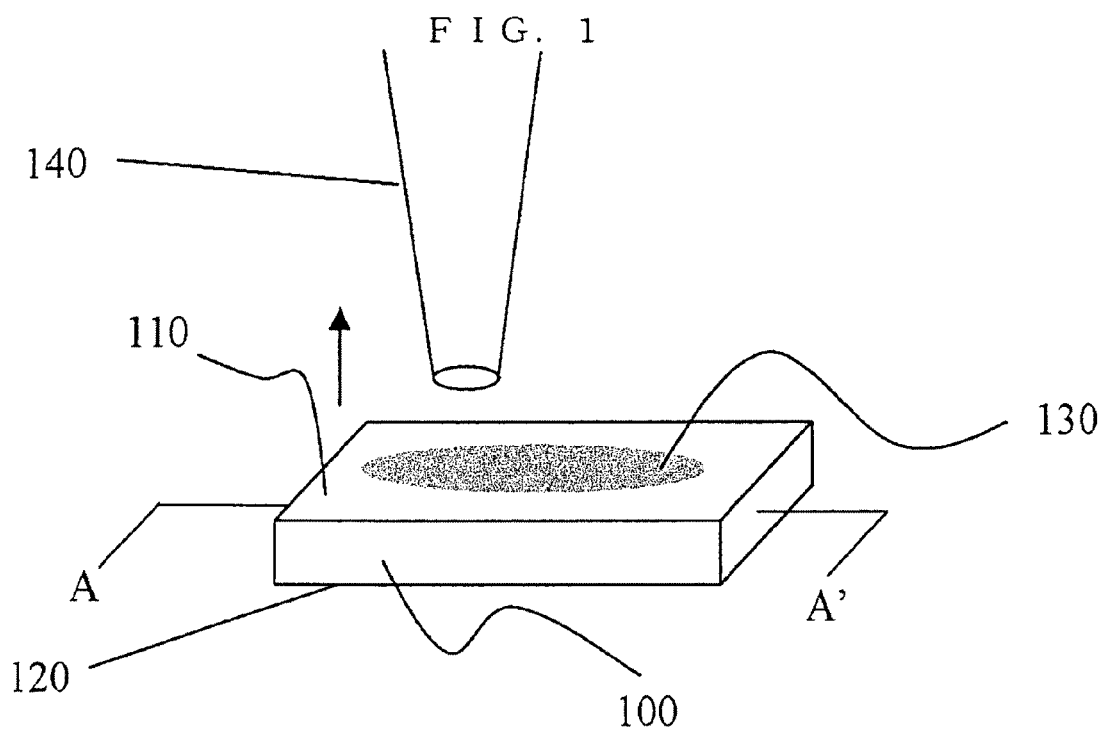
FIG. 1 is a schematic illustration of the technique according to the present invention.

100: ferroelectric single crystal
110: first face
120: second face
130, 330: polarization-reversed region
140: beam
200: condition
210: stop layer
220: expansion
310: SLT substrate
320: periodic polarization-reversed region
340: region

BEST MODE FOR CARRYING OUT THE INVENTION

Now, preferred embodiments of the present invention will be described in greater detail by referring to the accompanying drawings. Throughout the drawings, the same or similar components are denoted by the same reference symbols and will not be described repeatedly.

FIG. 1 is a schematic illustration of the technique according to the present invention.

While ferroelectric single crystal 100 may be any ferroelectric single crystal, it preferably is a ferroelectric single crystal having a 180° domain and showing a nonlinear optical effect from the viewpoint of optical applications. A 180° domain facilitates polarization inversion and the polarization that is inverted once by a method according to the invention can be maintained advantageously.

More specifically, the ferroelectric single crystal 100 to which the present invention is applicable may be a substantially stoichiometric lithium tantalate single crystal (to be simply referred to as SLT hereinafter) or a substantially stoichiometric lithium niobate single crystal (to be simply referred to as SLN hereinafter).

The inventors of the present invention found that such SLTs and SLNs are less defective and the method of the present invention is more effective if compared with known congruent lithium tantalate single crystals (to be referred to as CLT hereinafter) and known congruent lithium niobate single crystals (to be referred to as CLN hereinafter). The expression of substantially "stoichiometric" means that, although the mol fraction of $Li_2O/(Ta_2O_5+Li_2O)$ or $Li_2O/(Nb_2O_5+Li_2O)$ is not perfectly 0.500, it is equal to 0.495 to 0.505 and hence stoichiometrically more perfect than CLNs and CLNs.

Such SLTs and SLNs have a 180° domain as well as excellent piezoelectric effects, pyroelectric effects, electrooptic effects, and nonlinear optical effects and their novel characteristics can be expected to be exploited by utilizing a polarization-reversed region in the order of nanometers. Additionally, since SLTs and SLNs show a nonlinear optical constant (d constant) greater than other ferroelectric single crystals and hence are advantageous for optical applications.

For the purpose of the present invention, the SLN or the SLT may contain an element selected from a group of Mg, Zn, In and Sc by 0.1 mol % to 3.0 mol % (see, for example, JP 2001-287999-A and JP 2003-267798-A filed by the inventors of the present invention). Thus, as a result, the optical damage resistivity can be improved.

The ferroelectric single crystal 100 has a first face 110 that is perpendicular to the direction of polarization and a second face 120 that is opposite to the first face 110. When an SLT or an SLN is employed for the ferroelectric single crystal 100, the direction of polarization (indicated by an arrow in FIG. 1) is the direction of the Z-axis.

The ferroelectric single crystal 100 has a polarization-reversed region 130. The polarization-reversed region 130 can be formed by means of an appropriate method such as an electric field application method, a polarization inversion method using an ion exchange process or a micro domain inversion method using an electron beam. The polarization-reversed region 130 may have any contour. The polarization-reversed region 130 may be a periodic polarization-reversed structure or a micro domain structure.

The polarization-reversed region 130 may extend through from the first face 110 to the second face 120 or may not extend through from the first face 110 to the second face 120 depending on the ultimately prepared device.

The method of the present invention includes a step of irradiating a beam 140 on the surface of the ferroelectric single crystal 100 having such a polarization-reversed region 130.

Figure 2:
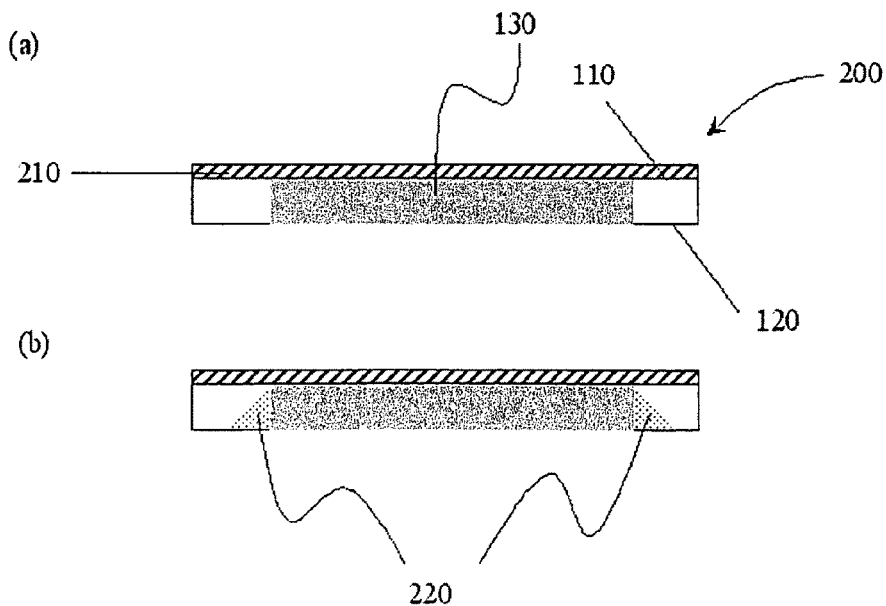
FIGS. 2A and 2B are schematic cross-sectional views taken along line A-A' in FIG. 1.

The beam 140 may be an ion beam or a neutral beam. Either beam can form a stop layer showing a low degree of order (210 in FIG. 2) in the ferroelectric single crystal 100 as will be described in greater detail hereinafter.

When irradiating an ion beam, the ion seed is rare gas ions or metal ions. Ion seeds that can be used for the purpose of the present invention include He, Ne, Ar, Zn, Nb and Mg but the present invention is by no means limited thereto. For the purpose of the present invention, ion beams include proton beams.

For the purpose of the present invention, a neutron beam is synonymous with a molecular/atomic beam. Such a neutral beam may be a helium beam or an argon beam but the present invention is by no means limited thereto. A neutral beam is characterized in that it can hardly give rise to a charge up phenomenon in a polarization-reversed region 130 if compared with an ion beam.

The surface to be irradiated is at least either the first face 110 or the second face 120. Either or both of the first face 110 and the second face 120 may be irradiated when the polarization-reversed region 130 extends through from the first face 110 to the second face 120, whereas only the first face 110 may be irradiated when the polarization-reversed region 130 does not extend through from the first face 110 to the second face 120.

The region to be irradiated may be the entire surface including the polarization-reversed region 130. Alternatively, only the polarization-reversed region 130 may be irradiated depending on the beam diameter.

The timing of irradiation is desirably immediately after the formation of the polarization-reversed region 130. The beam 140 is irradiated typically so as to get to the depth of 0.1 μm to 5 μm from the surface of the ferroelectric single crystal 100.

Now, the mechanism of fixing the polarization-reversed region 130 by irradiating a beam 140 will be described below in detail. FIGS. 2A and 2B illustrate an instance where a polarization-reversed region 130 extends through from the first face 110 to the second face 120 and a beam 140 is irradiated onto the first face 110.

FIGS. 2A and 2B are schematic cross-sectional views taken along line A-A' in FIG. 1.

FIG. 2A shows the condition 200 after irradiation of the beam 140 (FIG. 1). As the beam 140 is irradiated on the first face 110 of the ferroelectric single crystal 100, a stop layer 210 is formed in the first face 110.

The stop layer 210 operates to stop back-switching of the polarization-reversed region 130 in the direction of the Z-axis and also back-switching and/or expanding of the polarization-reversed region 130 in the X-direction and in the Y-direction.

The stop layer 210 shows a degree of order lower than that of the lattice points of the ferroelectric single crystal 100. The stop layer 210 may be amorphous. The inventors of the present invention found that the polarization-reversed region 130 is prevented from back-switching and expanding due to the difference in the degree of order.

The thickness of the stop layer 210 is typically 0.1 μm to 5 μm. The polarization-reversed region 130 is effectively prevented from back-switching and expanding when the thickness of the stop layer 210 is found within the above range.

While the conditions of irradiation of the beam 140 shown in FIG. 1 may be arbitrarily selected so long as a stop layer 210 is formed in the irradiated region, the conditions typically include injection energy that may be within a range between 100 KeV and 2 MeV and an ion injection rate that may be within a range between $1 \times 10^{12}$ cm$^{-2}$ and $1 \times 10^{17}$ cm$^{-2}$ when an ion beam is employed for the beam 140.

As shown in FIG. 2B, the polarization-reversed region 130 does not show any expansion 220 in any area remote from the stop layer 210.

Such an expansion 220 does not take place because it makes the polarization-reversed region unstable in terms of energy. Any back-switch does not take place from the stop layer 210 toward the second face 120 for the same reason.

Thus, once a stop layer 210 is formed and held in contact with the polarization-reversed region 130, the polarization-reversed region 130 stops back-switching and expanding in all directions because of the presence of the stop layer 210.

It may be needless to say that a similar effect can be realized by irradiating a beam 140 only onto the second face 120 or onto the second face 120 in addition to the first face 110 in the instance of FIGS. 2A and 2B as pointed out above.

The method of the present invention can be effective when the ferroelectric single crystal 100 (FIG. 1) is free from any defect and hence the difference in the degree of order of lattice points is large between the ferroelectric single crystal 100 and the stop layer 210.

Therefore, SLTs and SLNs are more effective than CLTs and CLNs.

An optical element that can be obtained by the method of the present invention is intended to be an appropriate element adapted to utilize polarization-reversed regions. More specifically, such an optical element may be a modulator or a wavelength conversion element.

Optical elements that can be obtained according to the present invention can improve the manufacturing yield because the back switch phenomenon and the expansion of polarization-reversed regions are suppressed in the working process. Additionally, such optical elements can improve the reliability of operation because any possible degradation of the optical characteristics caused by a back switch phenomenon by heating during operation is also suppressed.

An optical element according to the present invention may have a stop layer 210 or the stop layer 210 of the optical element may be removed by mechanical polishing.

As described above, the inventors of the present invention have invented a method of preventing any possible expansion of polarization-reversed regions and a back switch phenomenon from taking place after forming the polarization-reversed regions in the working process. While the polarization-reversed regions extending through the ferroelectric single crystal indispensably need to be held in contact with the control layer in order to suppress any possible expansion of polarization-reversed regions and a back switch phenomenon from taking place according to the conventional art, the inventors of the present invention found that the suppression effect can be achieved after forming desired polarization-reversed regions by the above-described method as a result of a variety of experiments conducted by the inventors of the present invention.

Furthermore, different from the conventional art, a control layer does not need to be arranged in advance so that the conditions of forming polarization-reversed regions can be fixed to conditions specific to ferroelectric single crystals. Therefore, the method of the present invention is free from failures in forming polarization-reversed regions due to the presence of a control layer that the conventional art entails. Additionally, the present invention can find applications where polarization-reversed regions are formed only in the surface.

EXAMPLE 1

Figure 3:
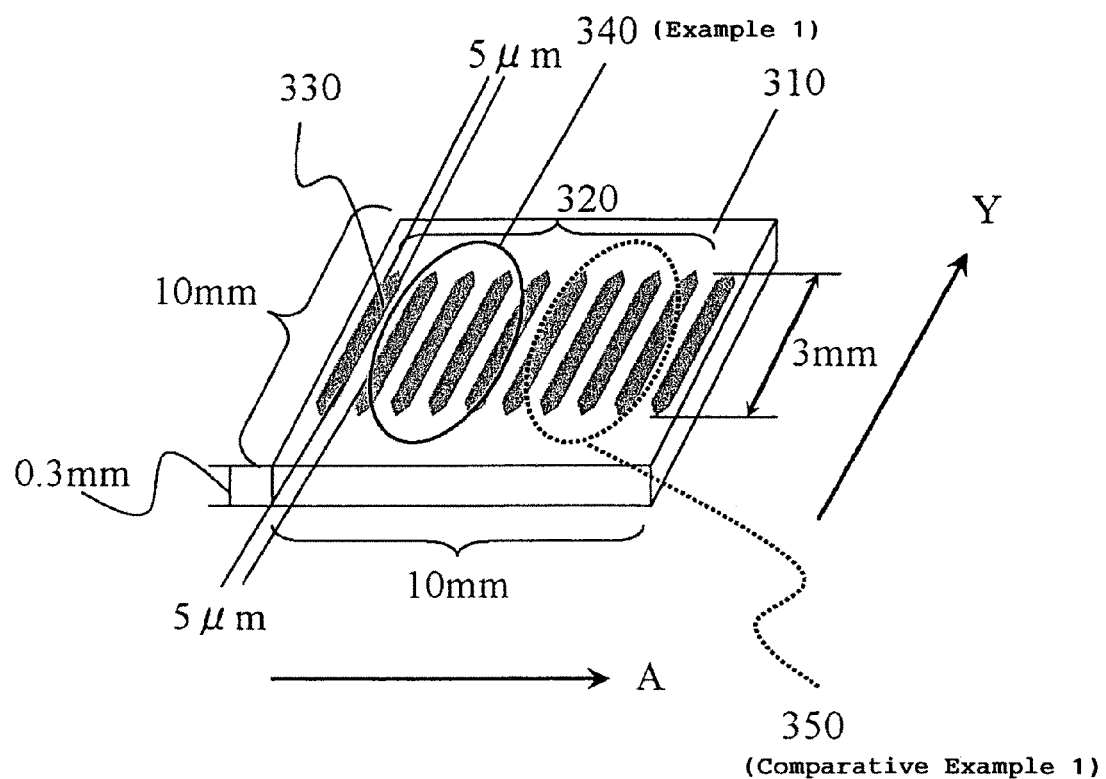
FIG. 3 is a schematic illustration of an SLT single crystal having periodic polarization-reversed structures used in Example 1 and Comparative Example 1.

FIG. 3 is a schematic illustration of an SLT single crystal having periodic polarization-reversed structures used in Example 1 and Comparative Example 1.

An SLT doped with 1 mol % of MgO manufactured by the raw material supply type double crucible Czochralski method was poled (for single polarization) and then cut and polished in the direction perpendicular to the direction of polarization so as to make it show a thickness of 0.3 mm to obtain an MgO-1 mol % doped SLT substrate 310. The dimensions of the obtained SLT substrate 310 were 10 mm (A-direction)×10 mm (Y-direction)×0.3 mm (thickness).

Periodic polarization-reversed regions 320 were formed in the SLT substrate 310 by means of a pulse electric field application method, using lithography. More specifically, a liquid electrode (LiCl aqueous solution) was applied onto the all the Z$^-$ surface and periodic metal electrode pieces of about 6 μm were applied to the Z$^+$ surface. The electrode pieces extend in the Y-direction. A single polarization-reversed region 330 had dimensions of 3 mm (Y-direction)×5 μm (A-direction). Polarization-reversed regions 330 were arranged in a repetitive manner so as to make the periodic polarization-reversed regions 320 show a length of 10 mm in the A-direction (longitudinal direction) as a whole.

Figure 4:
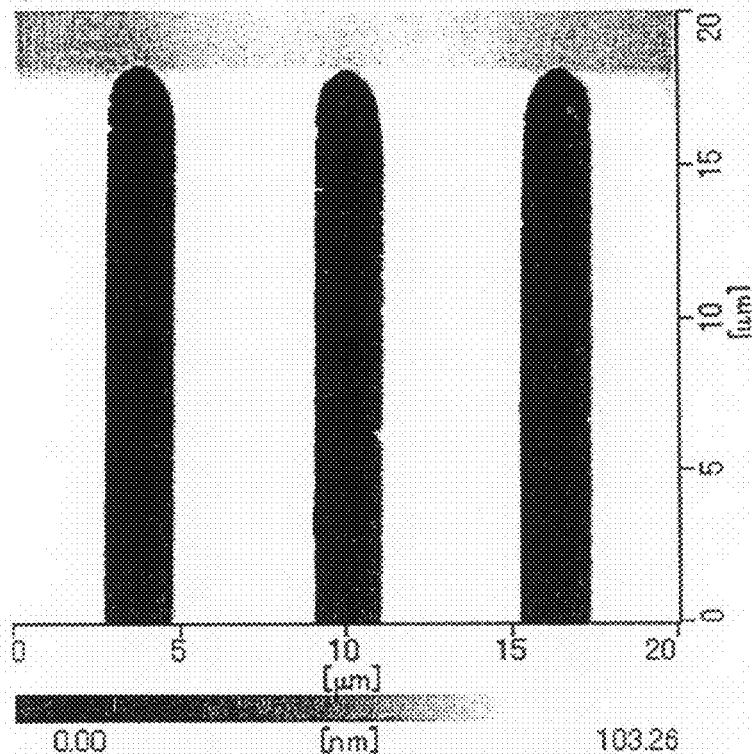
FIGS. 4A and 4B are schematic illustrations of the surface condition observed immediately after irradiating an ion beam in Example 1.
Figure 4:
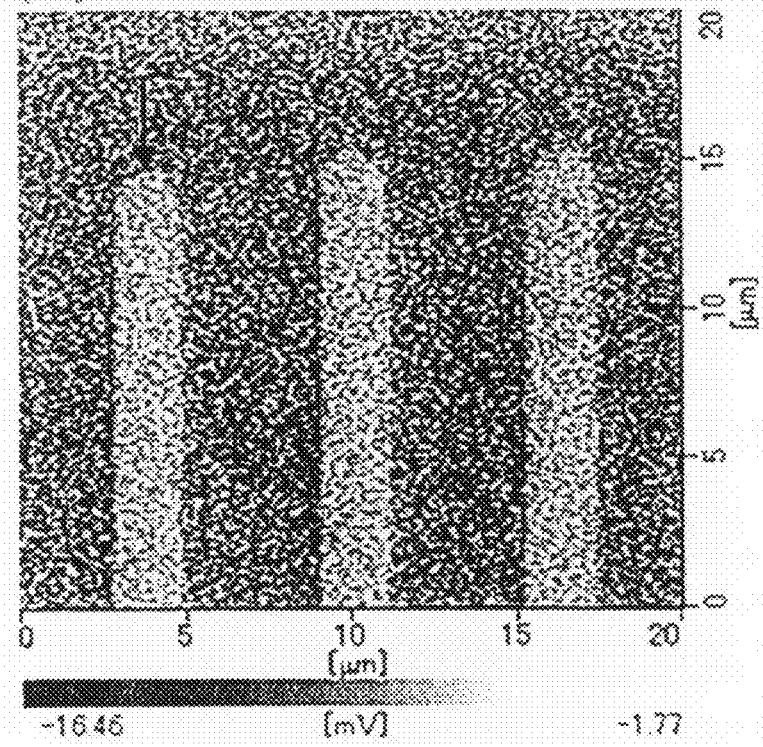

Subsequently, an ion beam was irradiated onto the region 340 by means of an ion accelerator (2 MV Type Ion Implanter, available from HVEE). The conditions of irradiation included an ion seed of Ar, an injection energy rate of 1 MeV, an ion injection rate of $1 \times 10^{14}$ cm$^{-2}$ and an injection depth of 0.6 μm. Thereafter, the surfaces of the periodic polarization-reversed regions 320 were observed as protrusions and recesses of the surface of the SLT substrate 310 by etching the surface thereof by means of HF aqueous solution. A scanning force microscope SFM (SPA 300HV available from Seiko Instruments Inc. Japan) was employed to observe the surface. The condition of observation was such that the sensing lever was driven to scan at a rate of 0.24 µm/sec. FIGS. 4A and 4B illustrate the results of the observation, which will be described hereinafter.

Figure 5:
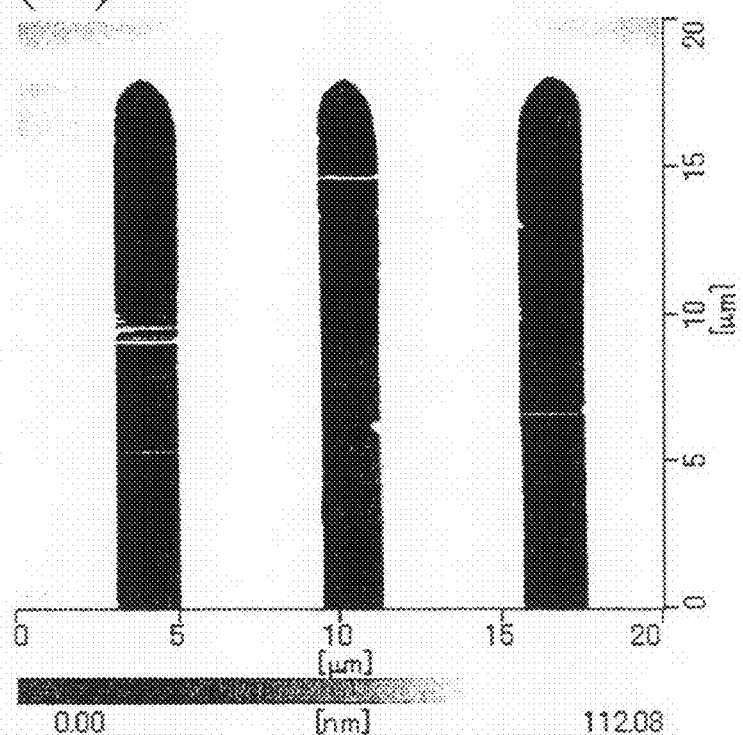
FIGS. 5A and 5B are schematic illustrations of the surface condition observed after irradiating an ion beam and executing a heat treatment process in Example 1.
Figure 5:
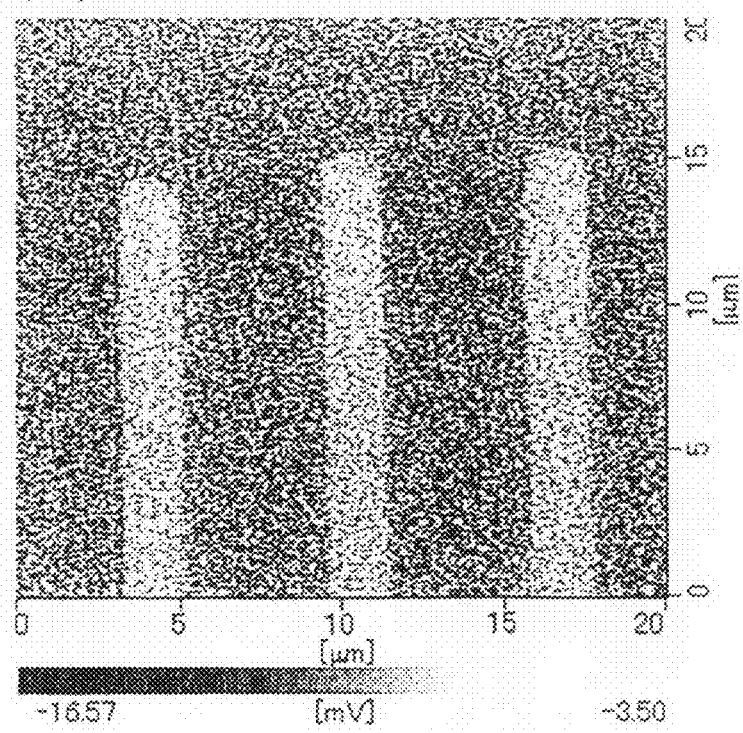

Then, the temperature of the SLT substrate 310 was raised to 100° C. and kept for 10 minutes at that temperature and then cooled quickly to the room temperature in order to look into the influence of back switch due to the above process. Thereafter (10 minutes thereafter), the temperature was lowered to the room temperature at a rate of 2.0° C./min. The above heat treatment was repeated three times. After the heat treatments, the surface condition of the region 340 of the SLT substrate 310 was observed by way of an SFM. FIGS. 5A and 5B illustrate the results of the observation, which will be described hereinafter.

Comparative Example 1

The procedure of Example 1 was followed except that a region 350 that is not irradiated with an ion beam was employed and hence the procedure will not be described here any further.

Figure 6:
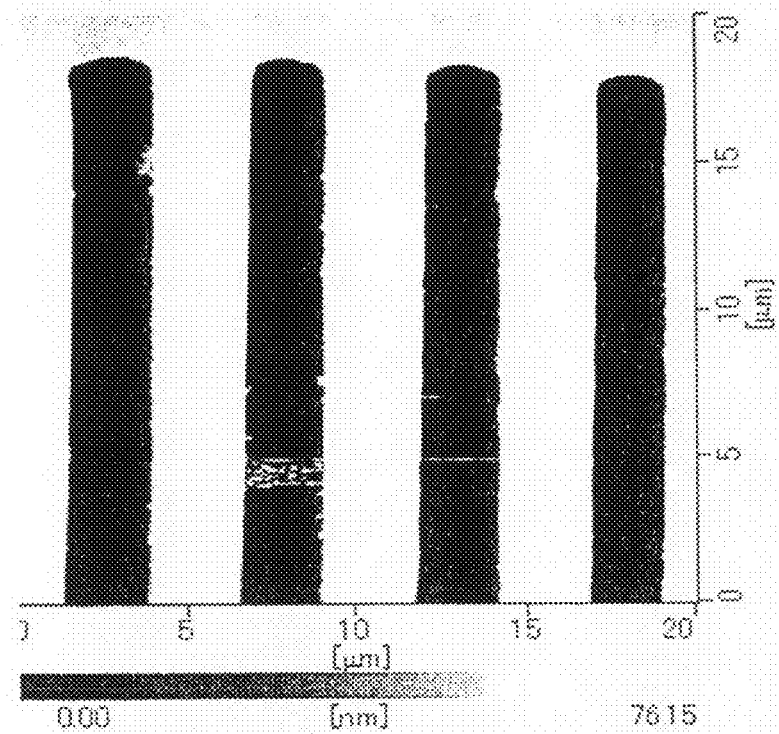
FIGS. 6A and 6B are schematic illustrations of the surface condition observed before and after executing a heat treatment process in Comparative Example 1.
Figure 6:
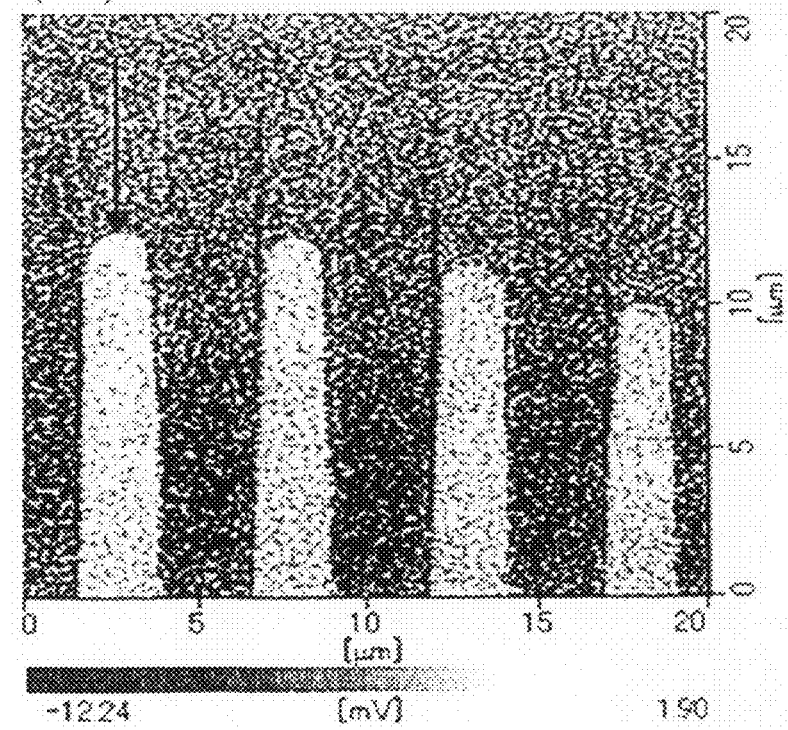

The region 350 was observed by way of an SFM after the heat treatments as in Example 1. FIGS. 6A and 6B illustrate the results of the observation, which will be described hereinafter.

FIGS. 4A and 4B are schematic illustrations of the surface condition observed immediately after irradiating an ion beam in Example 1.

FIG. 4A is a topo image (stereotopograph) showing the surface condition of the region 340 (FIG. 3) of the SLT substrate 310 (FIG. 3) immediately after the ion beam irradiation (and before the heat treatments). In FIG. 4A, the white area shown in contrast with black areas corresponds to the non-polarization-reversed region ($Z^+$ surface), whereas the black areas shown in contrast with the white area correspond to the polarization-reversed regions ($Z^-$ surface). The periodic polarization-reversed regions can be recognized as recesses on the surface because HF aqueous solution tends to etch a $Z^-$ surface quicker than a $Z^+$ surface. It will be seen from FIG. 4A that polarization-reversed regions were properly formed.

FIG. 4B is an illustration showing a piezoelectric response of FIG. 4A. Different from the topo image, the light areas shown in contrast in FIG. 4B correspond to the polarization-reversed regions ($Z^-$ surface), whereas the dark area shown in contrast in FIG. 4B corresponds to the non-polarization-reversed region ($Z^+$ surface). By comparing FIG. 4A and FIG. 4B, a back switch phenomenon (of about 3 µm) was observed in the part indicated by an arrow. It is known that thermal energy is applied in an etching process using HF aqueous solution to cause a back switch phenomenon. However, this effect can be neglected because no etching process is required when the sample is utilized as an optical element.

FIGS. 5A and 5B are schematic illustrations of the surface condition observed after irradiating an ion beam and executing a heat treatment process in Example 1.

FIG. 5A is a topo image (stereotopograph) showing the surface condition of the region 340 of the SLT substrate 310 after the irradiation of ion beam and then the heat treatments. FIG. 5B is an illustration showing a piezoelectric response of FIG. 5A. By comparing FIG. 4B and FIG. 5B, it will be seen that the piezoelectric responses are substantially the same.

Thus, it was found that the polarization-reversed regions 330 do not change after heat treatments. Although not illustrated, the same results were obtained by observing the rear surface of the SLT substrate 310.

FIGS. 6A and 6B are schematic illustrations of the surface condition observed before and after executing a heat treatment process in Comparative Example 1.

FIG. 6A is a topo image showing the surface condition of the region 350 (FIG. 3) of the SLT substrate 310 (FIG. 3) after the heat treatments that was not irradiated with an ion beam. The topo image of FIG. 6A was found to agree with the topo image obtained before the heat treatments. FIG. 6B clearly shows that a back switch phenomenon appeared as indicated by an arrow. The back switch clearly advanced by far than the back switch (FIG. 4B) that was produced as a result of etching.

Thus, the method of present invention is proved to be effective for suppressing the re-inversion (back switch) and the expansion of polarization-reversed regions that appear as a result of the subsequent processes.

INDUSTRIAL APPLICABILITY

As described above in detail, the method of the present invention can be utilized for any elements that utilize polarization-reversed regions formed in a ferroelectric single crystal such as an SLT. Particularly, the method of the present invention provides resistance against heating in the process of manufacturing such elements so that it can improve the reliability and the yield of manufacturing such elements. The present invention can be expected to find applications in novel optical elements because it provides micro-controllability in nanometer domains that the conventional art cannot.

The invention claimed is:

1. A method of fixing a polarization-reversed region formed in a ferroelectric single crystal, comprising:
   preparing a ferroelectric single crystal having a polarization-reversed region; and
   irradiating an ion beam or a neutral beam on the ferroelectric single crystal,
   wherein the ferroelectric single crystal is a substantially stoichiometric lithium tantalate single crystal or a substantially stoichiometric lithium niobate single crystal, and
   the polarization-reversed region is fixed and any back switch and expansion of the polarization-reversed region are suppressed.

2. The method according to claim 1, wherein the ferroelectric single crystal has a first face perpendicular to a direction of polarization and a second face opposite to the first face, and
   a beam is irradiated on at least either of the first face and the second face when the polarization-reversed region extends through from the first face to the second face and the beam is irradiated on the first face when the polarization-reversed region does not extend through from the first face to the second face, in the irradiating of the ion beam or the neutral beam.

3. The method according to claim 1, wherein the substantially stoichiometric lithium tantalate single crystal or the substantially stoichiometric lithium niobate single crystal contains an element selected from the group consisting of Mg, Zn, Sc, and In by 0.1 mol % to 3.0 mol %.

4. The method according to claim 2, wherein the beam is irradiated at least on the first face out of the first face and the second face when the polarization-reversed region extends through from the first face to the second face.

5. The method according to claim 2, wherein the first face is a $Z^-$ face and the second face is a $Z^+$ face.

6. The method according to claim 1, wherein the irradiating of the ion beam or the neutral beam forms a stop layer having a degree of order lower than a degree of order of lattice points of the ferroelectric single crystal.

* * * * *